(12) United States Patent
Seo (10) Patent No.: US 11,814,022 B2
(45) Date of Patent: Nov. 14, 2023

(54) HYDRAULIC BLOCK OF ELECTRONIC BRAKE SYSTEM FOR VEHICLE

(71) Applicant: HYUNDAI MOBIS CO., LTD., Seoul (KR)

(72) Inventor: Eu Dong Seo, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 257 days.

(21) Appl. No.: 17/237,219

(22) Filed: Apr. 22, 2021

(65) Prior Publication Data
US 2022/0266809 A1 Aug. 25, 2022

(30) Foreign Application Priority Data
Feb. 25, 2021 (KR) .................. 10-2021-0025949

(51) Int. Cl.
*B60T 17/04* (2006.01)
*F15B 15/08* (2006.01)
*B60T 8/34* (2006.01)
*B60T 13/68* (2006.01)

(52) U.S. Cl.
CPC .............. *B60T 17/04* (2013.01); *B60T 8/343* (2013.01); *F15B 15/08* (2013.01); *B60T 13/686* (2013.01)

(58) Field of Classification Search
CPC ........ B60T 17/04; B60T 13/686; B60T 8/343; B60T 8/344; F15B 15/08
USPC .................................................. 303/DIG. 10
See application file for complete search history.

(56) References Cited

U.S. PATENT DOCUMENTS

| 2007/0018498 | A1 | 1/2007 | Nakazawa | |
| 2007/0228820 | A1* | 10/2007 | Nakamura | B60T 8/4081 303/DIG. 10 |
| 2010/0276925 | A1 | 11/2010 | Bareiss et al. | |
| 2011/0273006 | A1 | 11/2011 | Nakazawa | |
| 2015/0025767 | A1 | 1/2015 | Feigel | |
| 2016/0280197 | A1* | 9/2016 | Mayr | B60T 13/686 |

(Continued)

FOREIGN PATENT DOCUMENTS

| CN | 1899899 A | 1/2007 | |
| CN | 104169141 A | 11/2014 | |
| EP | 0551256 B1 * | 7/1994 | ............... B60T 8/36 |

(Continued)

OTHER PUBLICATIONS

Machine translation WO 2021/004671. (Year: 2021).*
Korean Office Action dated Jul. 21, 2022, issued in corresponding Korean Patent Application No. 10-2021-0025949.

*Primary Examiner* — Thomas J Williams
(74) *Attorney, Agent, or Firm* — Morgan, Lewis & Bockius LLP (57) ABSTRACT

A hydraulic block of an electronic braking device for vehicles, includes: a first input port for receiving brake oil from a master cylinder; a first output port for discharging the brake oil to a wheel brake; a first inlet valve port for accommodating a first inlet valve disposed on a first inlet flow path connecting the first input port to the first output port; and a first outlet valve port for accommodating a first outlet valve disposed on a first outlet flow path configured to depressurize the brake oil. The first outlet flow path is configured to pressurize the first outlet valve in an axial direction of a first plunger mounted inside the first outlet valve and to deliver the brake oil to the first outlet valve.

11 Claims, 4 Drawing Sheets

(56) References Cited

U.S. PATENT DOCUMENTS

2017/0274883 A1     9/2017  Kim
2022/0266809 A1 *   8/2022  Seo ........................ B60T 8/343

FOREIGN PATENT DOCUMENTS

| JP | 2005-096592 A | 4/2005 | | |
|---|---|---|---|---|
| KR | 10-2010-0057889 A | 6/2010 | | |
| KR | 10-2017-0111310 A | 10/2017 | | |
| WO | WO-2021004671 A1 * | 1/2021 | .............. | B60T 17/02 |
| WO | WO-2022012788 A1 * | 1/2022 | | |

* cited by examiner

HYDRAULIC BLOCK OF ELECTRONIC BRAKE SYSTEM FOR VEHICLE

CROSS-REFERENCE TO RELATED APPLICATIONS

The present application is based on, and claims priority from, Korean Patent Application Number 10-2021-0025949, filed on Feb. 25, 2021, the disclosure of which is incorporated by reference herein in its entirety.

TECHNICAL FIELD

The present disclosure relates to a hydraulic block of an electronic braking device for vehicles.

BACKGROUND ART

The statements in this section merely provide background information related to the present disclosure and do not necessarily constitute prior art.

The vehicle's autonomous driving roadmap is divided into lever zero of full non-automated, level one capable of driver-assisted, level two capable of partially automated, level three capable of conditional automated, level four capable of highly automated, and level five capable of fully automated.

Autonomous vehicles can not only drive vehicles but also automate braking. Herewith, a failure of the main braking system requires braking capable of securing redundancy, until the driver's intervention (level 3) or even if there is no driver intervention (level 4 or higher). To this end, additional hydraulic pressure block using power source separated from the main braking system is provided to ensure the redundancy function.

The hydraulic block uses an inlet valve and an outlet valve for increasing and decreasing the pressure of brake oil. The brake oil enters the inlet valve in a direction that the brake oil from the master cylinder pushes up a plunger inside the inlet valve. Therefore, a linear reduction of the current supplied to the inlet valve when the plunger inside the inlet valve is blocking the seat can increase the amount of the brake oil entering the inlet valve from the master cylinder.

In case of an outlet valve, on the other hand, the brake oil from the master cylinder enters in the side direction of the outlet valve. Therefore, the brake oil enters the outlet valve with the plunger inside the outlet valve pressed in the direction of the seat. To open the outlet valve, the brake oil must push the plunger up with a force greater than the force to pressurize the plunger of the outlet valve. That is, since the opening of the outlet valve requires a large force instantaneously, the control unit needs to control the outlet valve to flow a large current momentarily. Therefore, there is a problem that the outlet valve cannot perform a linear-decompression control. This adversely affects an operational noise and a control precision.

SUMMARY

According to at least one embodiment, the present disclosure provides A hydraulic block of an electronic braking device for vehicles, comprising: a first input port for receiving brake oil from a master cylinder; a first output port for discharging the brake oil to a wheel brake; a first inlet valve port for accommodating a first inlet valve disposed on a first inlet flow path connecting the first input port to the first output port; and a first outlet valve port for accommodating a first outlet valve disposed on a first outlet flow path configured to depressurize the brake oil. The first outlet flow path is configured to pressurize the first outlet valve in an axial direction of a first plunger mounted inside the first outlet valve and to deliver the brake oil to the first outlet valve.

| Reference Numbers | |
|---|---|
| 1: brake system | 10: pedal |
| 11: reservoir | 12: master cylinder |
| 100: first hydraulic block | 200: second hydraulic block |
| 110: first main inlet flow path | |
| 112: first inlet flow path | |
| 114: second inlet flow path | |
| 120: first actuating unit | |
| 130: first main outlet flow path | |
| 132: first outlet flow path | |
| 134: second outlet flow path | |
| 140: first circulation flow path | |
| 150: first electronic control unit | |
| 301: first input port | |
| 302: first output port | |
| 303: second output port | |
| 311: first traction control valve port | |
| 312: first inlet valve port | |
| 313: second inlet valve port | |
| 314: first outlet valve port | |
| 315: second outlet valve port | |
| 132a: first linear-decompression flow path | |
| 134a: second linear-decompression flow path | |

DETAILED DESCRIPTION

A main object of a hydraulic block of the vehicle's electronic braking device according to an embodiment of the present disclosure is to make a control unit perform linear-decompression control using an outlet valve by changing the design of the outlet flow path so that a brake oil can flow in a direction of pushing up a plunger mounted inside the outlet valve when the brake oil enters the output valve.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), (a), (b), etc., in numbering components are used solely for the purpose of distinguishing one component from another but not to imply or suggest the substances, the order or sequence of the components. Throughout this specification, when a part "includes" or "comprises" a component, the part is meant to further include other components, not to exclude, unless there is a specific description contrary thereto.

Figure 1:
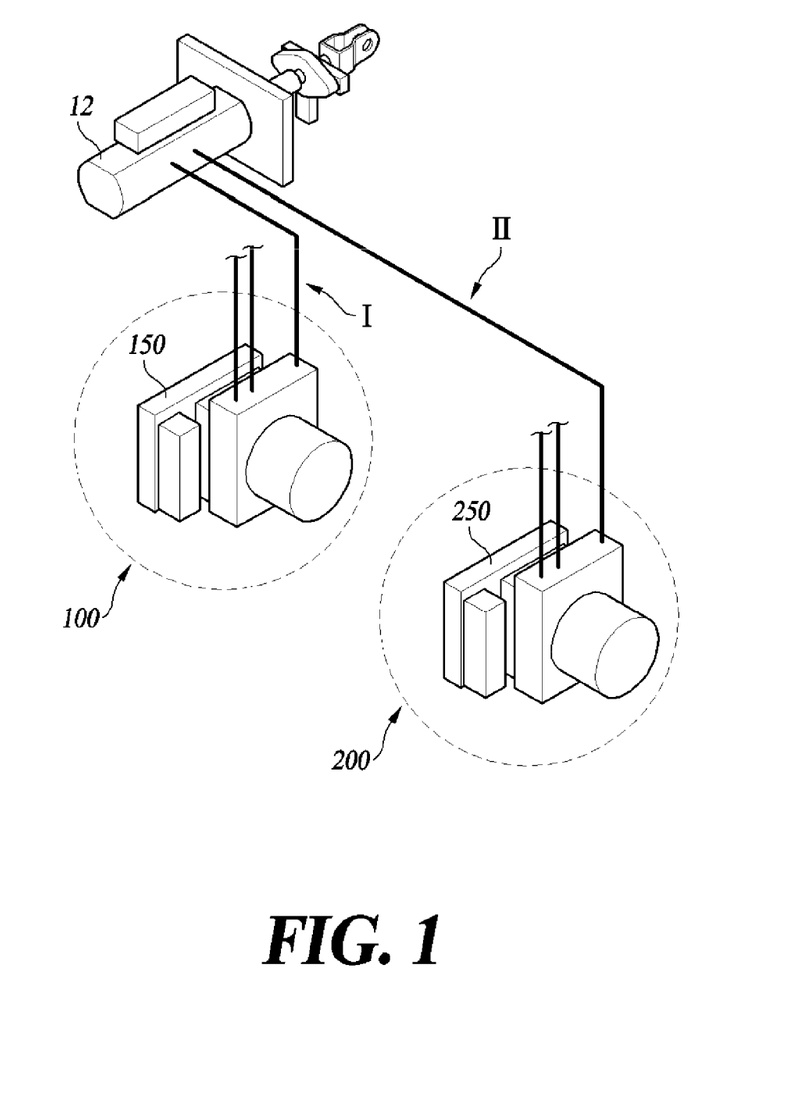
FIG. 1 is an exemplary diagram illustrating a portion of a brake system according to an embodiment of the present disclosure.

FIG. 1 is an exemplary diagram illustrating a portion of a brake system according to an embodiment of the present disclosure. With reference to FIG. 1, a brake system 1 according to the present disclosure includes all or part of a pedal 10 (see FIG. 2), a reservoir 11, a master cylinder 12, a first hydraulic block 100 including at least part of a first circuit I and a second hydraulic block 200 including a second circuit II.

The reservoir 11 is configured to accommodate brake oil.

The master cylinder 12 is in fluid communication with the reservoir 11, and at least part of the brake oil discharged from the reservoir 11 is accommodated. The master cylinder 12 is configured to form a driver's required braking force when the pedal 10 is depressed by the driver. Preferably, the master cylinder 12 may be of the tandem type, and brake oil discharged from a plurality of cylinders (not shown) is delivered to the first circuit I and the second circuit II, respectively.

Meanwhile, though not shown, a vacuum booster may be disposed between the pedal 10 and the master cylinder 12. A pedal stroke may be boosted by the vacuum booster.

The first hydraulic block 100 comprises at least part of the first circuit I and is arranged between the master cylinder 12 and a plurality of wheel brake mechanisms FR, FL, RR and RL. At least part of the brake oil discharged from the master cylinder 12 is supplied to the plurality of wheel brake mechanisms FR, FL, RR and RL through the first circuit I. That is, the first hydraulic block 100 is disposed on the first circuit I, by means of which the hydraulic pressure of the brake oil flowing through the first cylinder I may be increased or decreased.

The first hydraulic block 100 may preferably be an electronic stability control (ESC) module.

The plurality of wheel brake mechanisms FR, FL, RR, and RL (see FIG. 2) generate braking forces on a plurality of wheels (not shown) using the hydraulic pressure of the brake oil discharged from the reservoir 11.

The second hydraulic block 200 comprises at least part of the second circuit II and is arranged between the master cylinder 12 and the plurality of wheel brake mechanisms FR, FL, RR and RL. Since the structure and technical features of the second circuit II and the second hydraulic block 200 are identical or equivalent to those of the first circuit I and the first hydraulic block 100, the description thereof will be substituted for the description of the first circuit I. Meanwhile, since the first hydraulic block 100 and the second hydraulic block 200 share the same configuration, they may be controlled by the same algorithm. Thus, in product development, the logic complexity may be reduced and the likelihood of errors occurring may be decreased.

The first circuit I and the second circuit II are respectively connected to a plurality of cylinders (not shown) provided inside the master cylinder 12. The first circuit I and the second circuit II are not in fluid communication.

The first hydraulic block 100 and the second hydraulic block 200 operate independently of each other. The first hydraulic block 100 is controlled by a first electronic control unit 150 provided in the first hydraulic blocks 100 and the second hydraulic block 200 by a second electronic control units 250 provided in second hydraulic blocks 200. In addition, the first electronic control unit 150 and the second electronic control unit 250 have separate independent power supplies (not shown), so that the first hydraulic block 100 and second hydraulic block 200 use separate and independent power lines. Accordingly, the brake system 1 includes a plurality of modules of the first hydraulic block 100 and the second hydraulic block 200 that are independently controlled and driven, so that even when a failure occurs in one of the modules, it is possible to perform a brake function using the other module. Therefore, the brake system 1 according to the present disclosure has a redundancy function.

Figure 2:
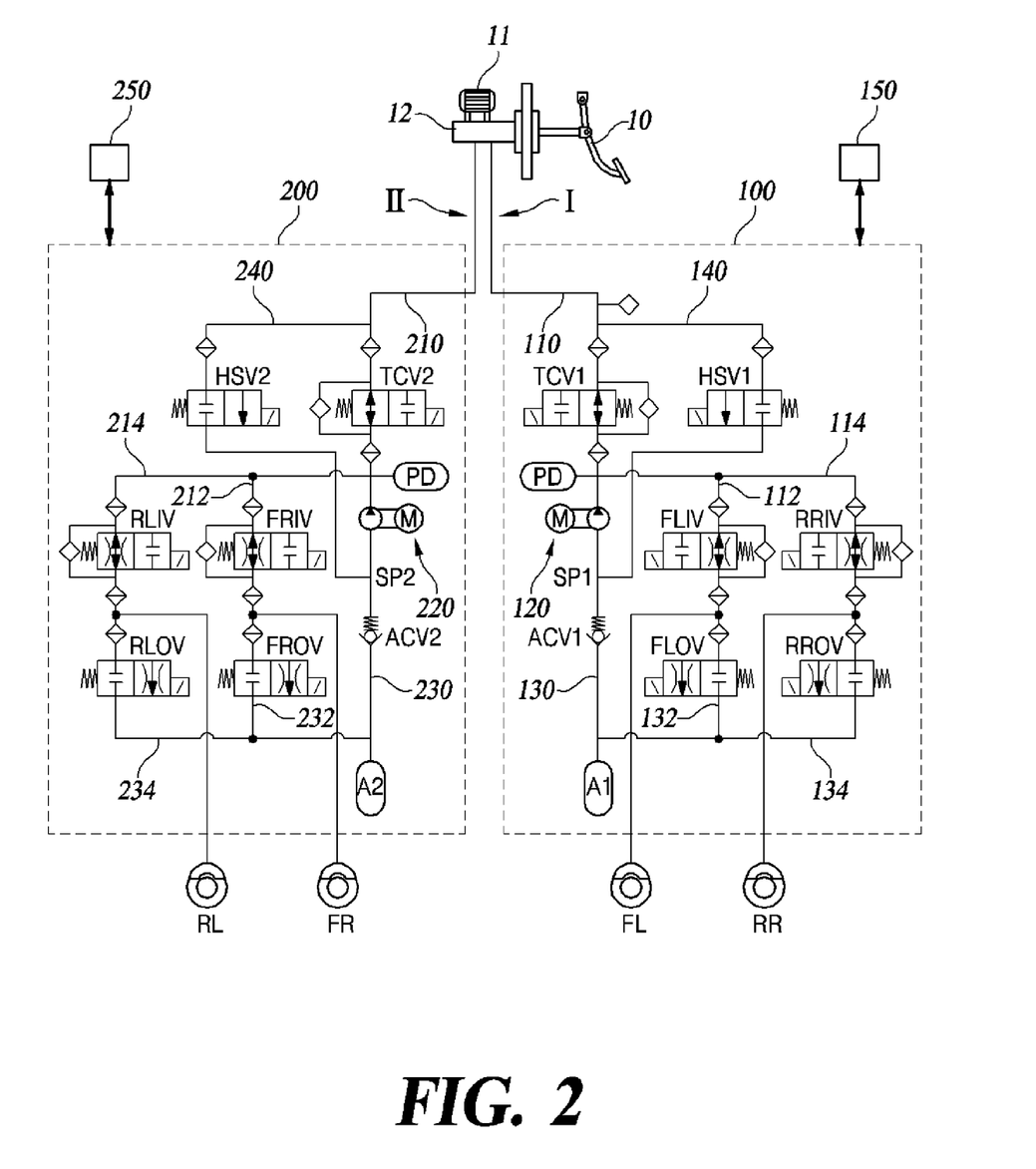
FIG. 2 is a hydraulic circuit diagram of a brake system according to an embodiment of the present disclosure.

FIG. 2 is a hydraulic circuit diagram of a brake system according to an embodiment of the present disclosure. In the present disclosure, with respect to the relative position of the flow path, what is referred to as "forward" or "backward" refers to an area disposed at a closer distance from the reservoir 11 as the brake oil flows, and refers to an area disposed at a larger distance as "backward". However, this not only means that they are directly in series forward or rearward, but also means a relatively farther, if any, flow path.

Further, in the present disclosure, the first hydraulic block 100 is shown to be an X-split type conduit that provides hydraulic pressure to the first and second wheel brake mechanisms FL, RR and the second hydraulic block 200 provides hydraulic pressure to the third and fourth wheel brake mechanisms FR, RL. However, the present disclosure is not necessarily limited thereto, and an H-split type conduit may be employed.

Referring to FIG. 2, components of the plurality of hydraulic blocks 100 and 200 will be described. The first hydraulic block 100 comprises all or part of the first main inlet flow path 110, a first actuating unit 120, a first main outlet flow path 130, a first circulation flow path 140 and the first electronic control unit 150.

The first main inlet flow path 110 is formed inside the first hydraulic block 100 and is configured to deliver the brake oil from the first circuit I to one or more wheel brake mechanisms FL and RR.

A first traction control valve TCV1 may be disposed at a point on the first main inlet flow path 110. The opening and closing of the first main inlet flow path 110 is regulated by the first traction control valve TCV1. The first traction control valve TCV1 is of the normal open type. Thus, in the non-powered mode when no braking signal is applied, the first traction control valve TCV1 is opened. When the first traction control valve TCV1 is closed, part of the brake oil pressurized by the first actuating unit 120 may not flow back to the master cylinder 12.

The first main inlet flow path 110 is branched out into the first inlet flow path 112 and the second inlet flow path 114. The first inlet flow path 112 and the second inlet flow path 114 are formed in the interior of the first hydraulic block 100 and connected to the first wheel brake mechanism FL and the second wheel brake mechanisms RR, respectively.

A first inlet valve FLIV is disposed at a position on the first inlet flow path 112, and opening and closing of the first outlet flow path 132 is adjusted by the first inlet valve FLIV. The first inlet valve FLIV is disposed in front of a point where the first inlet flow path 112 and an exit section of a first pump SP1 are connected. The first inlet valve FLIV is of the normal open type. Thus, in the non-powered mode, the first inlet valve FLIV is opened. When the first inlet valve FLIV is closed, part of the brake oil pressurized by the first pump SP1 is not delivered to the first wheel brake mechanism FL.

the description for the first inlet flow path 112 and the first inlet valve FLIV is similarly applied to the description of the second inlet flow path 114 and a second inlet valve RRIV, respectively due to their similarities in the configuration and function.

The first actuating unit 120 comprises the first pump SP1 and a motor M configured to drive the first pump SP1. The exit section of the first pump SP1 is connected to a point on the first main inlet flow path 110. At this time, a point where the outlet portion of the first pump SP1 and the first inlet flow path 110 are connected is formed in front of a bifurcation between the first inlet flow path 112 and the second inlet flow path 114. When the first pump SP1 is driven, the internal hydraulic pressure of one or more of the inlet flow passages, i.e., the inlet line 110, the first and second inlet flow paths 112 and 114 may increase.

The first main outlet flow path 130 is configured to deliver at least a part of the brake oil discharged from at least one of the first inlet flow path 112 and the second inlet flow path 114 to the first actuating unit 120.

One end of a first outlet flow path 132 is connected to a branch point on the first inlet flow path 112 formed at the rear of the first inlet valve FLIV, and the other end is connected at a point on the first main outlet flow path 130.

A first outlet valve FLOV is disposed at a point on the first outlet flow path 132. When the first outlet valve FLOV is opened, at least part of the brake oil flowing through the first inlet flow path 112 is discharged to the first output flow path 132.

The description of a second outlet flow path 134 and a second outlet valve RROV will be substituted for the description of the first outlet flow path 132 and the first exit valve FLOV, respectively. The first outlet flow path 132 and the second outlet flow path 134 merge at a point formed on the first main outlet flow path 130.

A first accumulator A1 may be arranged on the first main outlet flow path 130. The first accumulator A1 is disposed rearward of the junction point of the first outlet flow path 132 and the second outlet flow path 134. All or part of the brake oil discharged from at least one of the first outlet flow path 132 and the second outlet flow path 134 may be temporarily accommodated in the first accumulator A1. Therefore, it is possible to minimize damage occurring in the plurality of outlet flow passages 130, 132 and 134 due to pulsation of the brake oil. Here, the damage occurring in the plurality of outlet flow passages, i.e., the first main outlet flow path 130, the first outlet flow path 132 and the second outlet flow path 113 includes, for example, fatigue, deformation or abrasion occurring in at least part of the flow path when the flow paths are exposed to continuous pulsation for a long period of time.

The first circulation flow path 140 is connected at one end to a point on the first main inlet flow path 110 formed in front of the first traction control valve TCV1. The other end of the first circulation flow path 140 is connected to a point on the first main outlet flow path 130 adjacent to an entrance section of the second pump SP2. At this time, a point at which the other end of the first circulation flow path 140 is connected to the first main outlet flow path 130 is preferably formed behind the first accumulator A1. All or part of the brake oil supplied from the reservoir 11 may be supplied to the first actuating unit 120 through the first circulation flow path 140.

A first high pressure switching valve (HSV1) is disposed at a point on the first circulation flow path 140, and the first pressure switching valves (HSV1) regulate opening and closing of the first circulation flow path 140. The first high-pressure switching valve HSV1 is of the normally closed type. Thus, in the non-powered mode, the first high pressure switching valve HSV1 is closed. When the first high pressure switching valve HSV1 is opened, all or part of the brake oil supplied from the reservoir 11 may be supplied to the first actuating unit 120.

A first check valve ACV1 is disposed on the first main outlet flow path 130. At this time, the first check valve ACV1 is disposed at a position formed in front of the junction of the first circulation flow path 140 and the first main outlet flow path 130. At this time, the first check valve ACV1 is disposed behind the first accumulator A1. As a result, the brake oil introduced from the first circulation flow path 140 may be prevented from entering the first accumulator A1.

The first electronic control unit 150 is mounted on the first hydraulic block 100. The first electronic control unit 150 controls the operation of a plurality of valves and a drive unit or the like mounted on the first hydraulic block 100. In other words, the first electronic control unit 150 applies an electrical signal to the first hydraulic block 100 such that hydraulic pressure required for braking is provided to at least some of the plurality of wheel brake mechanisms FR, FL, RR, and RL.

Since the configuration and technical characteristics of the second hydraulic block 200 are identical or equivalent to those of the first hydraulic block 100, the detailed description about the second fluid block 200 will be substituted for the description about the first fluid block 100.

The first electronic control unit 150 is powered by a first power source (not shown) and the second control unit 250 by a second power source (not shown). Thus, when a failure occurs in one of the first power source and the second power source, a control unit connected to the other power source may apply a control signal to the hydraulic block to generate the hydraulic pressure for braking. This ensures redundancy in the brake system 1 according to the present disclosure.

The brake system 1 according to the present disclosure may further include a hydraulic pressure sensor (reference number not indicated) configured to sense an inner pressure of either the first main inlet flow path 110 or the second inlet flow path 210. When the pedal 10 is pressed or there is forced driving of the plurality of modules of the first and second hydraulic blocks 100 and 200 during autonomous driving, the pressure sensor measures the pressure of the master cylinder 12 to confirm whether the system is abnormal. For example, if the pressure of the master cylinder 12 is not varied by the pressure sensor despite the depression of the pedal 10, a failure may be detected in at least a part of the brake system 1.

Figure 3:
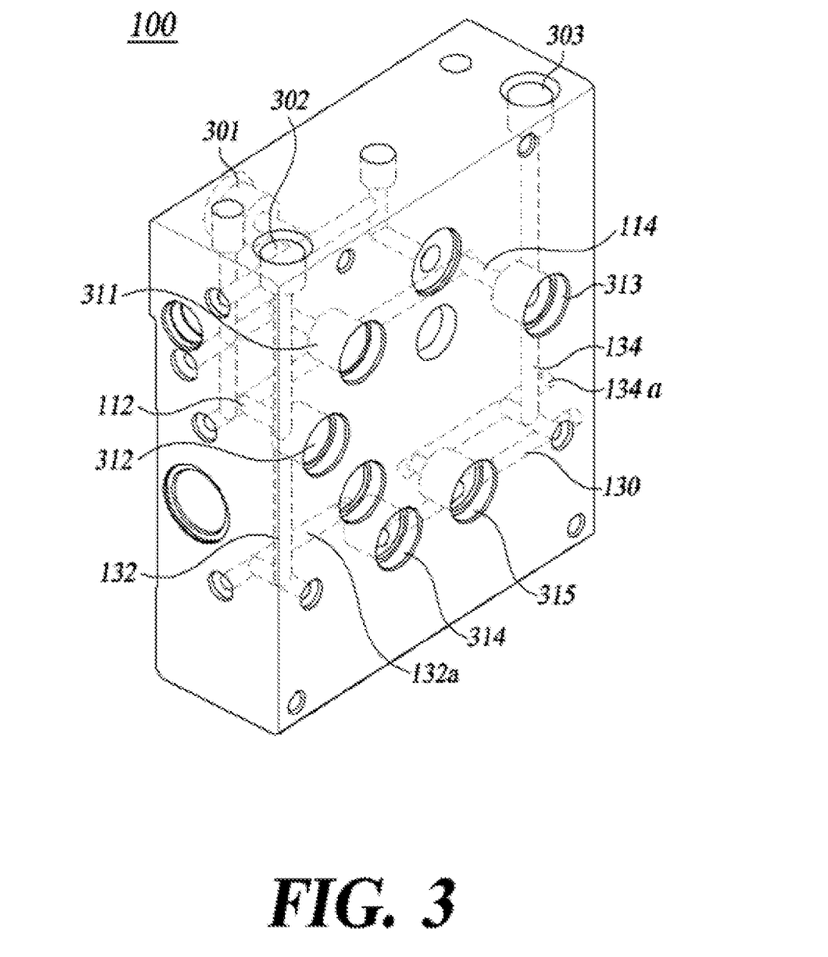
FIG. 3 is a diagram showing a hydraulic block of the vehicle's electronic braking device according to an embodiment of the present disclosure.

FIG. 3 is a diagram showing a first hydraulic block of an electronic braking device for vehicles according to an embodiment of the present disclosure.

Referring to FIG. 3, a first hydraulic block 100 of the vehicle's electronic braking device includes all or part of a first input port 301, a first output port 302, a second output port 303, the first inlet flow path 112, the second inlet flow path 114, the first outlet flow path 132, a first linear-decompression flow path 132*a*, the second outlet flow path 134, a second linear-compression flow path 134*a*, a first traction control valve port 311, a first inlet valve port 312, a second inlet valve port 313, a first outlet valve port 314, and a second outlet valve port 315.

The first input port 301 is formed to receive the brake oil from the master cylinder (12 in FIG. 2).

The first output port 302 and the second output port 303 are configured to provide the brake oil delivered by the first input port 301 to at least some of the plurality of wheel brake mechanisms FR, FL, RR, and RL. For example, the first output port 302 delivers brake oil introduced into the first input port 301 to a wheel brake device, such as the first wheel brake mechanism FL. The second output port 303 also delivers the brake oil flowing into the first input port 301 to a wheel brake device, for example, the second wheel brake mechanism RR.

The first traction control valve port 311 is configured to be capable of accommodating the first friction control valve TCV1.

The first inlet valve port 312 is configured to accommodate the first inlet valve FLIV and the second inlet valve port 313 is configured to be capable of accommodating the second inlet valve RRIV.

The first outlet valve port 314 is configured to accommodate the first outlet valve FLOV and the second outlet valve port 315 is configured to be capable of receiving the second outlet valve RROV.

The first inlet flow path 112 is a flow path connecting the first input port 301 and the first output port 302, and the second inlet flow path 114 is a flow path connecting between the first and second input ports 301 and 303.

A typical solenoid valve includes a plunger (not shown). When brake oil is introduced into the solenoid valve, the plunger is pressed by the brake oil.

For example, in the case of a common inlet valve, the brake oil exerts the pressure in the axial direction of the plunger, i.e. in the direction to push up the plunger installed inside the inlet valve when the brake oil flows into the inlet valve. On the other hand, in the case of a typical outlet valve, when brake oil flows into the outlet valve the brake oil exerts the pressure in the vertical direction of the plunger axis, i.e., in the direction of the first hydraulic block vertically down.

Therefore, a large force is required instantaneously for the common outlet valve to release the pressure exerted in the vertical direction of the plunger shaft and to open the outlet valve.

In the case of an inlet valve, a linear sublimation may be achieved because the brake oil slowly presses the solenoid valve against the pressure in the direction of the plunger axis. On the other hand, in the case of a common outlet valve, a linear-decompression is difficult because the brake oil instantaneously presses a large force against the solenoid valve in the vertical direction of the plunger shaft.

However, the hydraulic block of the vehicle's electronic braking device according to the embodiment of the present disclosure has the effect of enabling the linear-decompression by changing the design of the first outlet flow path 132 and the first and second outlet flow paths 134 therein.

A hydraulic block of an electronic braking device for vehicles according to an embodiment of the present disclosure includes the first hydraulic block 100 and the second hydraulic block 200. Accordingly, the inner portion of each hydraulic block according to an embodiment of the present disclosure may be simplified in configuration as compared with a conventional single module to secure free space.

Accordingly, the hydraulic block of the vehicle's electronic braking device according to the embodiment of the present disclosure can change the design of the first outlet flow path 132 and the second outlet flow pat 134 to take advantage of this free space. For example, the first outlet flow path 132 further includes the first linear-decompression flow path 132a and the second outlet flow path 134 further comprises a second linear-decompression flow path 134a. This allows the brake oil to be delivered to the first outlet valve FLOV and the second outlet valve RROV in the axial direction of the plunger.

When the brake oil is delivered to the outlet valve in the axial direction of the plunger, the brake oil may be linearly decompressed because the plunger is gradually pushed up when the brake oil flows into the solenoid valve.

The first outlet flow path 132 includes the first linear-decompression flow path 132a, which bypasses the brake oil delivered from the first outlet flow path 132 and supplies the brake oil to a first outlet valve (FLOV) in a direction parallel to the first output valve port 314.

For example, the first linear-decompression flow path 132a receives the brake oil in a vertically downward direction from the first input port 301 or the first outlet flow path 132. The first linear-decompression flow path 132a bypasses the brake oil and supplies the first outlet valve FLOV with brake oil in a direction of pushing up a first plunger (not shown) provided in the first inlet valve FLOV.

Similarly, the second linear-decompression flow path 134a receives the brake oil in a vertically downward direction from the first input port 301 or the second outlet flow path 134. The second linear-decompression flow path 134a bypasses the brake oil and supplies the second outlet valve RROV with brake oil in a direction of pushing up a second plunger (not shown) provided in the second output valve RROV.

That is, when the brake oil is supplied to the first outlet valve FLOV and the second outlet valve RROV, the first plunger and the second plunger are gradually pushed up in the axial direction, so that the outlet valves are able to linearly decompress the brake oil.

Figure 4:
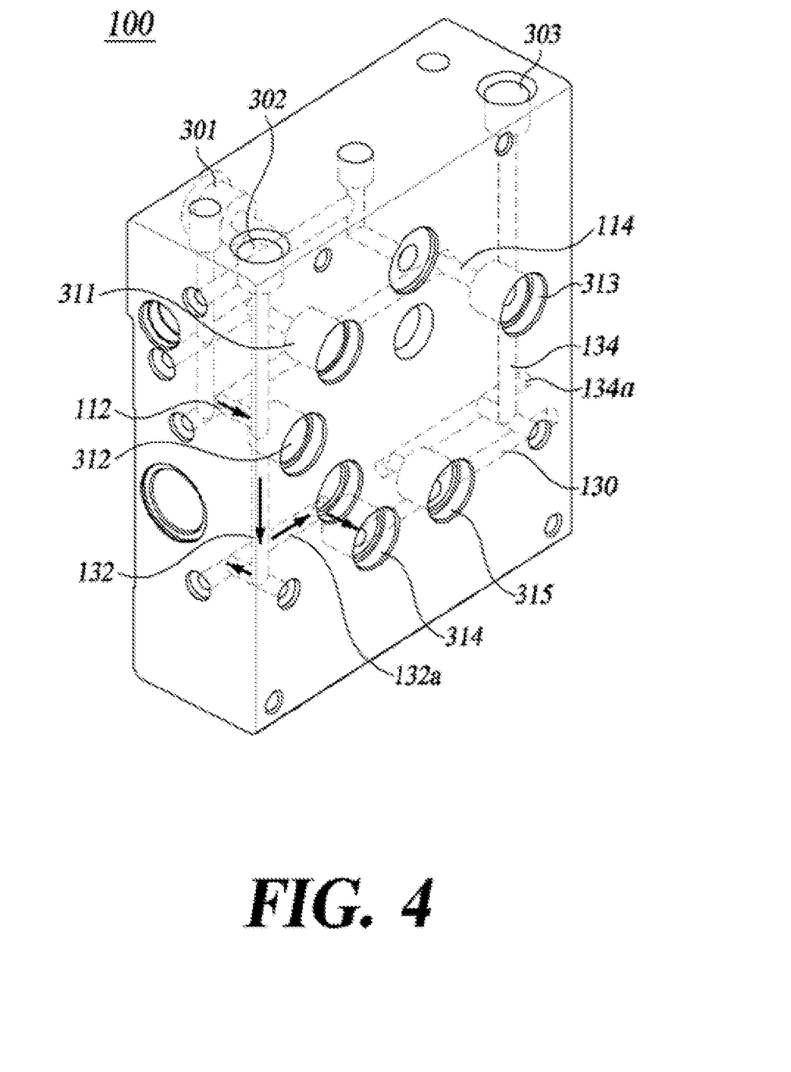
FIG. 4 is a diagram showing a flow of brake oil inside a hydraulic block of the vehicle's electronic braking device according to an embodiment of the present disclosure.

FIG. 4 is a diagram showing a flow of brake oil inside a hydraulic block of the vehicle's electronic braking device according to an embodiment of the present disclosure.

Referring to FIG. 4, the arrows shown in FIG. 4 indicate the flow of brake oil.

The first electronic control unit 150 may depressurize the brake oil by using a first outlet valve FLOV attached to the first outlet valve port 314. For example, the brake oil introduced from the first input port 301 passes through the first inlet valve FLIV mounted on the first inlet valve port 312. A part of the passed brake oil is discharged to the first outlet flow path 132, and the discharged brake oil moves downward and flows into the first linear-decompression flow path 132a.

Here, the first linear-decompression flow path 132a bypasses the brake oil flowing downward. For example, the first linear-decompression flow path 132a bypasses the brake oil in a direction in which the brake oil pushes up the first plunger, and then supplies the first outlet valve FLOV with brake oil.

Therefore, the first electronic control unit 150 may linearly decompress the brake oil flowing into the first outlet valve FLOV by gradually changing the current flowing through the second outlet valve FLOV. For example, a method of performing decompression by increasing the current flowing in the first outlet valve FLOV, or a method that performs decompression by decreasing the current circulating in the second outlet valve FLOV may be applied.

The description of the process in which the first electronic control unit 150 linearly decompresses using the second outlet valve RROV will be substituted for the description of the process of linearly decompressing the first outlet valve FLOV.

As described above, according to the present embodiment, there is an effect that the control unit performs the linear-decompression control using the outlet valve by changing the design of the outlet flow path so that the plunger mounted inside the outlet valve can be pushed up when the brake oil enters the outlet valve.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above descriptions but by the claims and equivalents thereof.

What is claimed is:

1. A hydraulic block of an electronic braking device for vehicles, comprising:
    a first input port for receiving brake oil from a master cylinder;
    a first output port for discharging the brake oil to a wheel brake;
    a first inlet valve port for accommodating a first inlet valve disposed on a first inlet flow path connecting the first input port to the first output port; and
    a first outlet valve port for accommodating a first outlet valve disposed on a first outlet flow path configured to depressurize the brake oil,
    wherein the first outlet flow path is configured to pressurize the first outlet valve in an axial direction of a first plunger mounted inside the first outlet valve and to deliver the brake oil to the first outlet valve,
    the first outlet flow path includes a first linear-decompression flow path,
    the first linear-decompression flow path being configured to bypass the brake oil delivered from the first input port in a vertically downward direction, and to supply the brake oil to the first outlet valve in a direction parallel to the first outlet valve port,
    the first linear-decompression flow path is vertically connected with the first outlet flow path to receive the brake oil, and
    the first linear-decompression flow path includes at least two perpendicularly-bent portions after the brake oil passes a connection point of the first linear-decompression flow path with the first outlet flow path and before the brake oil reaches the first outlet valve port.
2. The hydraulic block of claim 1, wherein
    the first outlet valve is configured to receive the brake oil from the first outlet flow path in the axial direction of the first plunger and to linear-decompress the brake oil.
3. The hydraulic block of claim 1, wherein
    the first outlet flow path and the first linear-decompression flow path are disposed on different planes.
4. The hydraulic block of claim 1, wherein
    the first linear-decompression flow path bypasses the brake oil to supply the brake oil to the first outlet valve in a direction to which the first plunger is pushed up.
5. The hydraulic block of claim 4, wherein
    both of the first outlet valve port and the first linear-decompression flow path are disposed to pass through one plane parallel to a bottom plane of the hydraulic block.
6. The hydraulic block of claim 1, further comprising,
    a second output port for discharging the brake oil from the first input port to another wheel brake;
    a second inlet valve port for accommodating a second inlet valve disposed on a second inlet flow path connecting the first input port to the second output port; and
    a second outlet valve port for accommodating a second outlet valve installed on a second outlet flow path configured to depressurize the brake oil,
    wherein the second outlet flow path is configured to pressurize the second outlet valve in an axial direction of a second plunger mounted inside the second outlet valve and to deliver the brake oil to the second outlet valve.
7. The hydraulic block of claim 6, wherein
    the second outlet valve is configured to receive the brake oil from the second outlet flow path in the axial direction of the second plunger and to linear-decompress the brake oil.
8. The hydraulic block of claim 6, wherein
    the second outlet flow path includes a second linear-decompression flow path,
    the second linear-decompression flow path being configured to bypass the brake oil delivered from the first input port in a vertically downward direction, and to supply the brake oil to the second outlet valve in a direction parallel to the second outlet valve port.
9. The hydraulic block of claim 8, wherein
    the second linear-decompression flow path is vertically connected with the second outlet flow path to receive the brake oil in a vertically downward direction, and
    the second linear-decompression flow path bypasses the brake oil to supply the brake oil to the second outlet valve in a direction to which the second plunger is pushed up.
10. The hydraulic block of claim 9, wherein
    both of the second outlet valve port and the second linear-decompression flow path are disposed to pass through one plane parallel to a bottom plane of the hydraulic block.
11. The hydraulic block of claim 6, wherein
    the second outlet flow path and the second linear-decompression flow path are disposed on different planes.

* * * * *